(No Model.)
H. E. SWIFT.
PRICE COMPUTING SCALE.
No. 542,816. Patented July 16, 1895.
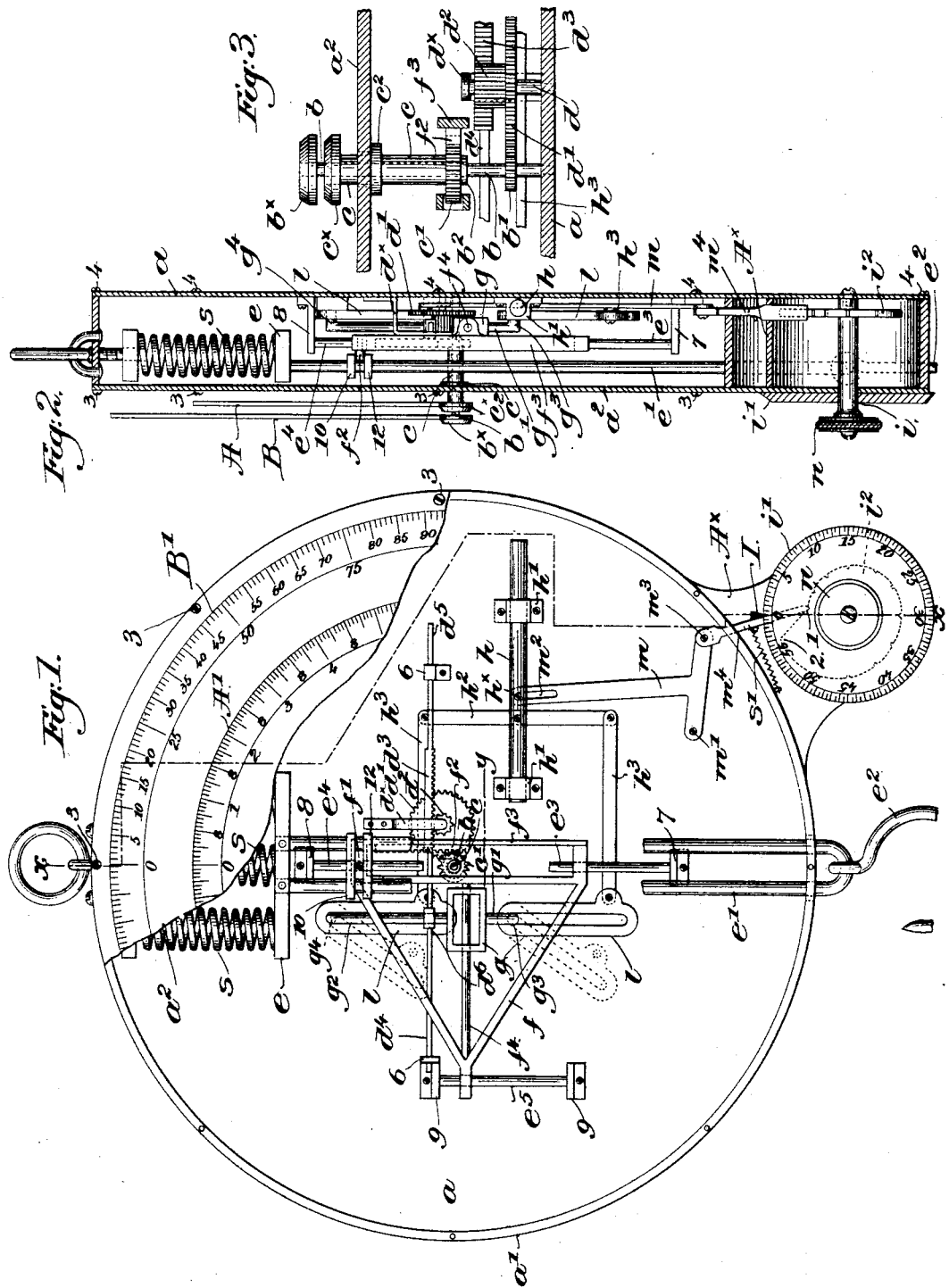
Witnesses.
Fred S. Greenleaf
Thomas J. Drummond
Inventor:
Horace E. Swift,
by Crosby & Gregory, attys.

UNITED STATES PATENT OFFICE.

HORACE E. SWIFT, OF BOSTON, MASSACHUSETTS, ASSIGNOR OF ONE-HALF TO ADDISON W. JONES, OF SAME PLACE.

PRICE-COMPUTING SCALE.

SPECIFICATION forming part of Letters Patent No. 542,816, dated July 16, 1895.

Application filed November 21, 1894. Serial No. 529,459. (No model.)

*To all whom it may concern:*

Be it known that I, HORACE E. SWIFT, of Boston, county of Suffolk, State of Massachusetts, have invented an Improvement in Price-Computing Scales, of which the following description, in connection with the accompanying drawings, is a specification, like letters and figures on the drawings representing like parts.

Mechanisms of various kinds have been devised for measuring an article and to indicate upon a suitable scale the number of units therein, and also to indicate upon another scale the aggregate price of such article for a given unit price, the price-indicating device being actuated by computing mechanism, and the measuring and computing mechanisms have been connected in such a manner that the operation of measuring the number of units in the article will operate the computing mechanism in accordance with the unit price which is determined by the operator. In this class of apparatus it is a comparatively simple matter to produce an accurate measuring mechanism; but to produce a computing mechanism which will accurately compute and indicate the aggregate price for any and all unit-prices is a very difficult matter, depending largely upon the accuracy with which the entire apparatus is constructed and assembled. So far as I am aware it is new to construct such an apparatus in which the computing mechanism is controlled by the movement of a suitable actuator in a direction which is the resultant of two forces applied to said actuator at right angles to each other, one of said forces being governed by the measuring mechanism and the other by a controlling device adjustable according to the unit price of the article measured, the measurement and the computed price being indicated by rotatable pointers co-operating with two scales on a suitable dial; and my invention has for its object the production of an apparatus embodying such principle, whereby great accuracy of operation is obtained by simple mechanism having few parts and admitting of great nicety of adjustment without a large expenditure of skilled labor.

In accordance therewith my invention consists in a price-computing apparatus containing the following instrumentalities, viz: measuring mechanism movable in a right line, an actuator moved thereby in a parallel path and also movable at right angles thereto, a controlling device adjustable according to the unit price to govern the lateral movement of the actuator, price-computing mechanism connected to said actuator and operated in a given ratio to the measuring mechanism by the resultant movement imparted to the actuator, and visual indicators for and operated respectively by said measuring and computing mechanism, substantially as will be described.

Other features of my invention will be hereinafter described, and particularly pointed out in the claims.

Figure 1, in elevation and partly broken out, represents a price-computing apparatus embodying my invention. Fig. 2 is a sectional view thereof taken on the irregular line $x$ $x$, Fig. 1, looking to the left; and Fig. 3 is an enlarged detail view on the line $y$, Fig. 1.

I have herein shown the operative mechanism as inclosed in a casing composed preferably of a back $a$, side wall $a'$, and a face $a^2$, (shown in Fig. 1 as largely broken out to show the mechanism underneath) the said parts of the casing being connected by suitable screws, as 3 and 4. (See Figs. 1 and 2.)

A spindle $b$, having fast thereon a pinion $b'$, is mounted in the back $a$ and extends through an opening in the face $a^2$ to receive thereon at its outer end the hub $b^\times$ of a hand or pointer B, said hand being shown only in Fig. 2, and surrounding the pinion $b$, between a collar $b^2$ thereon and the inner side of the face, is loosely mounted a sleeve $c$, having secured thereto a pinion $c'$ and a collar $c^2$ to bear against the inner side of the face, the sleeve projecting through said face and having secured thereto the hub $c^\times$ of a hand or pointer A. (See Fig. 2.)

A spindle $d$ is mounted to rotate in the back $a$ and in a bracket $d^\times$ secured to said back, said spindle having fast thereon a gear $d'$ in engagement with the pinion $b'$ and a pinion $d^2$ in engagement with and to be rotated by a rack $d^3$, shown as extended at its ends, as at $d^4$ and $d^5$, Fig. 1, to slide longitudinally in fixed guides 6 secured to the back, the extension $d^4$ of the rack having an annular enlargement $d^6$ thereon for a purpose to be described.

It will be seen from an inspection of Fig. 1 that the rack may be reciprocated in its guides by which it is retained in engagement with the pinion $d^2$, and said pinion and consequently the hand B will be moved through an angular distance proportional to the throw of the rack, the arrangement being such that movement of the rack from one to the other extreme will rotate the pinion $d^2$ once, and, through the intervening gear $d'$ and pinion $b'$, will cause the hand or pointer B to traverse a scale B' on the face or dial from the zero-point to the highest point on such scale.

This scale is divided to represent dollars and cents, a sufficient portion of the scale being shown in Fig. 1 to be understood.

A yoke $e$ is attached to the top of the casing by springs $s$ in usual manner, and a U-shaped rod $e'$ is secured at its ends to the yoke, the bent end of the rod extending through a suitable opening in the side wall of the casing diametrically opposite the point of attachment of the springs, and a hook or other suitable device $e^2$ (shown only in Fig. 1 and partly broken out) is connected to the projecting portion of the bent rod, whereby the pressure applied to the hook will distend the springs, as is common in spring-scales.

Guides $e^3$ and $e^4$ are supported in alignment by brackets 7 and 8, respectively secured to the back $a$, and a third guide $e^5$ parallel to the other two guides is held in brackets 9. (Clearly shown in Fig. 1.) These guides are extended through bearings in and support a substantially triangular frame $f$, which is free to slide longitudinally on said guides, and its upper corner $f'$ is herein shown as having upon its outer face a post or stud $f^2$, extended loosely between two parallel cross-bars 10 and 12, secured transversely to the bent rod $e'$, thereby permitting slight lateral movement of the stud between them, so that reciprocation of the said rod $e'$ will impart a like movement to the carriage $f$, sliding it longitudinally upon its guides, the extent of movement of the carriage being coincident with that of the rod $e'$, forming part of the measuring mechanism. A toothed-rack $f^2$ is secured to or formed on the longitudinal side $f^3$ of the carriage in engagement with the pinion $c'$, longitudinal movement of the carriage through said rack and pinion rotating the hand A to co-operate with the scale A' on the dial, said scale being herein shown as divided to indicate pounds and fractions thereof, the length of the rack $f^2$ being such that complete movement thereof in one direction will rotate the pinion $c'$ once to cause the hand A to travel from zero once around the scale A'. The carriage is provided with a cross-bar $f^4$ at right angles to the path of movement of said carriage, and the actuator for the computing mechanism is mounted upon and to slide longitudinally on said cross-bar.

I have herein shown the actuator as composed of a base or body $g$, to which oppositely-extended arms $g'$ and $g^2$ are secured parallel to the path of movement of the carriage and downturned at $g^3$ and $g^4$, respectively, to enter longitudinal slots in like links $l$, pivotally supported at their upper ends on suitable posts erected on the back $a$ of the casing, and in their full-line position, Fig. 1, the links are shown as in alignment and with their slots parallel to the path of movement of the carriage, so that during the movement of the carriage $f$ by or through the measuring mechanism the actuator will move up and down therewith in a right line without any lateral movement. If, however, the links are moved in parallelism into the dotted-line positions, Fig. 1, or into any position out of alignment, but in parallelism with each other, the travel of the downturned ends of the arms $g'$ and $g^2$ in the slots of the links will cause a lateral movement of the actuator proportional to the angle through which the links have been moved, in addition to its movement in a right line parallel to the path of the carriage—that is to say, two forces are applied to the actuator in directions at right angles to each other, and the actuator will have a resultant movement corresponding to the length of the path over which each force will cause said actuator to be moved, and it makes no difference, so far as the ultimate position of the actuator is concerned, whether it is first moved in a path parallel to the right line in which the measuring mechanism moves and then is moved laterally thereto by swinging the links through a certain arc, or whether the links have been first swung through such arc and the carriage then moved by the measuring mechanism.

The arm $g^2$ is shown as extended through the annular enlargement or eye $d^6$ on the extension $d^4$ of the rack-bar $d^3$, so that the resultant movement of the actuator, accomplished as hereinbefore described, will give to said rack-bar a variable throw, such throw being dependent not only upon the movement of the actuator parallel to the path of movement of the measuring mechanism, but also to its lateral movement at right angles thereto, the throw of the rack $d^3$ by means of the intemediate gearing causing the hand or pointer B to travel over a corresponding arc on the scale B'.

The movement of the links about their pivots is governed by a controlling device adjustable according to the unit price of the article to be measured, and I have herein shown said controlling device as consisting of a slide-rod $h$, longitudinally movable in suitable guides $h'$ on the back $a$ and having rigidly secured to it a cross-bar $h^2$, pivotally connected to the links $l$ by rods $h^3$, so that longitudinal movement of the slide-rod $h$ will move the links simultaneously through equal arcs.

A post $i$, provided at its upper end with a suitable thumb-nut $n$, is rotatably supported in an offset portion $A^\times$ of the casing, said post having fast thereon a dial-plate $i'$, having suitable graduations thereon from zero to any desired number, sixty graduations being herein shown, to indicate the price per unit of the article to be measured, a suitable index-point, as I, being displayed on the top of the offset portion adjacent to the periphery of the dial-plate I'.

Within the part $A^\times$ of the casing, and shown by dotted lines in Fig. 1 and in edge view in Fig. 2, a plate $i^2$ is secured to and to be rotated by the post $i$, the periphery of said plate being shown as an evolute between the points 1 and 2, and in practice this evolute periphery will contain as many notches as there are graduations on the index-plate $i'$, though to avoid confusion I have herein shown a notch corresponding to only every fifth graduation on the dial-plate.

A bell-crank lever $m$, pivoted to the back at $m'$, is connected to the slide-rod $h$ by a pin $h^\times$ on the latter extended through a slot $m^2$ at one extremity of said lever, and the other arm of the lever has pivoted thereto at $m^3$ a finger $m^4$, the free end of which is held in engagement with the notched periphery of the plate $i^2$ by a suitable spring $s'$, and from an inspection of Fig. 1 it will be obvious that the lever $m$ will be swung more or less about its pivot $m'$ as the notched plate is rotated through a larger or smaller arc by means of the thumb-nut $n$, the beveled end of the finger $m^4$ entering one notch after another and with the engaged notch acting as a lock to prevent accidental movement of the controlling device.

The throw of the slide-rod $h$ by the described devices is such that the links $l$ will be swung through proportionate arcs, so that the indicating hand or pointer B will be moved by the computing mechanism through an arc bearing a certain ratio to the arc described by the hand or pointer A moved by the measuring mechanism, such ratio being determined by the unit price of the article to be measured. The greater the unit price the larger the arc over which the price-indicating hand B will be moved for a given number of units indicated by the measuring mechanism.

In the operation of the mechanism described it is immaterial whether the article is measured and then the unit-price-controlling device is set or whether such device be first set and then the article measured.

I have herein shown one simple form of controlling device for regulating the movement of the links $l$; but it will be obvious that other means may be equally well used, as, for instance, the slide-rod $h$ might be geared directly to the post of the unit-price controller, so that rotation of the latter through a certain angle would move the slide-rod longitudinally a proportional distance.

My invention is not restricted to the precise construction and arrangement of parts as herein shown, for, so far as I am aware, it is broadly new to construct a price-computing apparatus on the right-line principle herein described, the measurement and aggregate price of the article measured for a given unit price being indicated by rotatable pointers or hands moved over a dial provided with concentric scales.

By the term "computing mechanism" I mean the rack $d^3$ having a variable throw and the intermediate gearing between it and the indicating-pointer to actuate the latter, and the controlling device, adjustable according to the unit price of the article to be measured, includes the links $l$ and means to move them through an arc corresponding to the given unit price.

I claim—

1. In a price computing apparatus the following instrumentalities, viz:—measuring mechanism movable in a right line, an actuator moved thereby in a parallel path and also movable at right angles thereto; a controlling device, adjustable according to the unit price, to govern the lateral movement of the actuator; price computing mechanism connected to said actuator and operated in a given ratio to the measuring mechanism by the resultant movement imparted to the actuator; and visual indicators for and operated respectively by said measuring and computing mechanisms, substantially as described.

2. In a price computing apparatus, the following instrumentalities, viz:—a counterbalanced measuring mechanism movable in a right line; an actuator moved thereby in a parallel path and also movable at right angles thereto; a controlling device, adjustable according to the unit price, to govern such lateral movement; price computing mechanism, including a rack connected to and given a variable throw by said actuator corresponding to the resultant movement imparted to the latter; fixed guides for said rack; a dial provided with unit and price indicating scales, and co-operating pointers having a relative movement thereover, controlled respectively by said measuring and computing mechanisms, substantially as described.

3. In a price computing apparatus the following instrumentalities, viz:—computing mechanism, an actuator therefor; measuring mechanism; connections between it and the actuator to transmit motion thereto in a right line; a controlling device, adjustable according to the unit price, to move the actuator at right angles to the fixed direction, whereby a variable resultant movement is given to the actuator, and a corresponding movement thereby to the computing mechanism; and unit and price indicating pointers moved respectively by the measuring and computing mechanisms in a determinable ratio, substantially as described.

4. In a price computing apparatus, the following instrumentalities, viz:—a counter-balanced measuring mechanism movable in a right line, a carriage moved thereby, and guides for the carriage; an actuator movable on the carriage at right angles to its path of movement, price computing mechanism including a rack connected to and given a variable throw by said actuator, a controlling device adjustable according to the unit price to govern the lateral movement of the actuator on the carriage, a spindle, a surrounding sleeve, each having secured thereto a pinion and an indicating hand, said pinions being geared respectively to the computing and measuring mechanisms, and a dial provided with scales to be traversed by said pointers respectively, substantially as described.

5. In a price computing apparatus, the following instrumentalities, viz:—measuring mechanism, a carriage moved thereby, in a right line, computing mechanism, an actuator therefor laterally movable on said carriage, slotted links to govern the lateral movement of the actuator, means to adjust said links in accordance with the unit price of the article measured, and a locking device for said means, substantially as described.

6. In a price computing apparatus, the following instrumentalities, viz:—measuring and computing mechanisms, each including as an element a rack having a variable throw, indicating pointers connected by gearing to and to be rotated by said racks to indicate the measurement and the computed price of an article, an actuator for the computing mechanism, connections between it and the measuring mechanism to move said actuator in a right line, and a controlling device adjustable according to the unit price to determine the lateral movement of the actuator, substantially as described.

7. In a price computing apparatus, the following instrumentalities, viz:—counterbalanced measuring mechanism movable in a right line, a carriage movable in unison therewith, an actuator movable on said carriage at right angles to its path, slotted links pivoted in the normal path of movement of the actuator, pivotally extended arms on the actuator and downturned to engage said links, a controlling device to swing the links through equal arcs according to the unit price, said controlling device including a rotatable plate having an evolute periphery notched to correspond to a given number of unit prices, and a co-operating finger, and mechanism to compute the aggregate price of the article measured, said mechanism being operated by the resultant movement of the actuator due to the action of the measuring mechanism and controlling device, substantially as described.

In testimony whereof I have signed my name to this specification in the presence of two subscribing witnesses.

HORACE E. SWIFT.

Witnesses:
ADDISON W. JONES,
JOHN C. EDWARDS.